(12) United States Patent
Ryderstam et al.

(10) Patent No.: US 7,769,520 B2
(45) Date of Patent: Aug. 3, 2010

(54) TRACTIVE FORCE MAP

(75) Inventors: Jan Ryderstam, Halta (SE); Soren Eriksson, Kungalv (SE)

(73) Assignee: Ford Global Technologies, LLC, Dearborn, MI (US)

( * ) Notice: Subject to any disclaimer, the term of this patent is extended or adjusted under 35 U.S.C. 154(b) by 984 days.

(21) Appl. No.: 10/694,167

(22) Filed: Oct. 27, 2003

(65) Prior Publication Data

US 2005/0090964 A1    Apr. 28, 2005

(51) Int. Cl.
*B60L 15/20* (2006.01)
(52) U.S. Cl. .............................. 701/82; 701/84; 701/87; 180/197; 318/432; 318/433; 318/434
(58) Field of Classification Search .................. 701/82, 701/74, 10, 70, 48, 84, 87; 180/197; 123/339.16, 123/339.2, 339.22, 339.24; 303/139; 318/432–434
See application file for complete search history.

(56) References Cited

U.S. PATENT DOCUMENTS

| | | | | |
|---|---|---|---|---|
| 4,505,145 | A * | 3/1985 | Bergstrom et al. ............. | 72/457 |
| 4,582,141 | A * | 4/1986 | van der Lely .................. | 172/3 |
| 4,671,138 | A | 6/1987 | Nobumoto et al. | |
| 5,041,978 | A | 8/1991 | Nakayama et al. | |
| 5,119,299 | A * | 6/1992 | Tamura et al. ................. | 701/85 |
| 5,151,861 | A * | 9/1992 | Danno et al. ................... | 701/90 |
| 5,278,761 | A | 1/1994 | Ander et al. | |
| 5,323,870 | A * | 6/1994 | Parigger et al. ............. | 180/197 |
| 5,351,776 | A * | 10/1994 | Keller et al. .................... | 701/70 |
| 5,462,122 | A * | 10/1995 | Yamamoto et al. ............. | 172/2 |
| 5,485,885 | A * | 1/1996 | Matsushita et al. ............. | 172/7 |
| 5,515,927 | A * | 5/1996 | Matsushita et al. ............. | 172/3 |
| 5,519,617 | A | 5/1996 | Hughes et al. | |
| 5,564,507 | A * | 10/1996 | Matsushita et al. ............. | 172/3 |
| 5,699,248 | A * | 12/1997 | Nakagami et al. ............. | 701/50 |
| 5,711,025 | A * | 1/1998 | Eckert et al. ................... | 701/83 |
| 5,732,371 | A | 3/1998 | Fujita | |
| 5,732,376 | A | 3/1998 | Hrovat et al. | |
| 6,038,505 | A | 3/2000 | Probst et al. | |
| 6,125,314 | A * | 9/2000 | Graf et al. ....................... | 701/53 |
| 6,151,537 | A * | 11/2000 | Gheordunescu et al. ........ | 701/1 |

(Continued)

FOREIGN PATENT DOCUMENTS

DE    4111023    *   4/1991

(Continued)

OTHER PUBLICATIONS

Farrelly, J. et al., "Estimation of Vehicle Lateral Velocity Using State Observers," Proceedings of the 1996 IEEE International Conference on Control Applications, Dearborn, MI, pp. 1-10, Jan. 1996.*

(Continued)

*Primary Examiner*—Cuong Nguyen
(74) *Attorney, Agent, or Firm*—Frank A. MacKenzie; Price, Heneveld, Cooper, DeWitt & Litton, LLP

(57) ABSTRACT

A method of controlling tractive force of a vehicle comprising determining a tractive force request of a driver of the vehicle, determining an actual tractive force of the vehicle, and modifying the actual tractive force of the vehicle to be equal to the tractive force request.

19 Claims, 2 Drawing Sheets

U.S. PATENT DOCUMENTS

| | | | |
|---|---|---|---|
| 6,188,945 B1 | 2/2001 | Graf et al. | |
| 6,230,107 B1 * | 5/2001 | Yamamoto et al. | 702/96 |
| 6,278,916 B1 * | 8/2001 | Crombez | 701/22 |
| 6,321,144 B1 * | 11/2001 | Crombez | 701/22 |
| 6,379,281 B1 * | 4/2002 | Collins et al. | 477/107 |
| 6,382,018 B2 * | 5/2002 | Knestel | 73/118.1 |
| 6,434,469 B1 * | 8/2002 | Shimizu et al. | 701/84 |
| 6,528,959 B2 * | 3/2003 | Kitano et al. | 318/55 |
| 6,542,793 B2 * | 4/2003 | Kojima et al. | 701/1 |
| 6,542,806 B1 * | 4/2003 | Suhre et al. | 701/82 |
| 6,757,603 B2 * | 6/2004 | Nozaki | 701/51 |
| 6,763,295 B2 * | 7/2004 | Katakura et al. | 701/70 |
| 6,819,995 B2 * | 11/2004 | Bellinger | 701/53 |
| 6,829,943 B2 * | 12/2004 | Weyand et al. | 73/760 |
| 7,410,023 B2 * | 8/2008 | Crombez | 180/197 |
| 7,634,342 B2 * | 12/2009 | Post, II | 701/48 |
| 2005/0090964 A1 * | 4/2005 | Ryderstam et al. | 701/82 |

FOREIGN PATENT DOCUMENTS

| | | | |
|---|---|---|---|
| JP | 2000-346287 | * | 11/2000 |
| JP | 2000-346288 | * | 11/2000 |
| JP | 2001-225144 | * | 7/2001 |

OTHER PUBLICATIONS

Weighted two-dimensional longitudinal impedance for driving support system; Mulder, M. et al.; Systems, Man and Cybernetics, 2004 IEEE International Conference on; vol. 1; Digital Object Identifier: 10.1109/ICSMC.2004.1398306; Publication Year: 2004, pp. 256-260 vol. 1.*

The force model of wireless active actuation for capsule endoscope in the GI tract; Dongmei Chen et al.; Robotics and Biomimetics, 2007. ROBIO 2007. IEEE International Conference on; Digital Object Identifier: 10.1109/ROBIO.2007.4522141 Publication Year: 2007, pp. 93-98.*

The Development of a Linear Switched Reluctance Motor with Improved Force Profile; Filho, A. F. et al.; Power Electronics, Machines and Drives, 2006. The 3rd IET International Conference on; Publication Year: 2006, pp. 192-196.*

Nonlinear control design for implementation of specific pedal feeling in brake-by-wire car design concepts; Hildebrandt, A. et al.; American Control Conference, 2004. Proceedings of the 2004; vol. 2; Publication Year: 2004, pp. 1463-1468 vol. 2.*

A practical PID-based scheme for the collaborative driving of automated vehicles; Xavier, Packiaraj et al.; Decision and Control, 2009 held jointly with the 2009 28th Chinese Control Conference. CDC/CCC 2009. Proceedings of the 48th IEEE Conference on Digital Object Identifier: 10.1109/CDC.2009.5400734; Publication Year: 2009, p. 9.*

Encoderless PM Brushless drive for electric vehicle traction; Yousfi, D.; Industrial Electronics, 2009. IECON '09. 35th Annual Conference of IEEE, Digital Object Identifier: 10.1109/IECON.2009.5415372; Publication Year: 2009, pp. 3797-3802.*

Velocity Estimation by Using Position and Acceleration Sensors; Wen-Hong Zhu et al.; Industrial Electronics, IEEE Transactions on; vol. 54, Issue: 5; Digital Object Identifier: 10.1109/TIE.2007.899936; Publication Year: 2007, pp. 2706-2715.*

* cited by examiner

TRACTIVE FORCE MAP

BACKGROUND OF THE INVENTION

The present invention relates to motive force for a vehicle, and in particular to tractive force control for a motor vehicle. Vehicles include wheels that transmit a tractive force to the riding surface of the vehicle to move the vehicle. The wheels are connected to a drive train of the vehicle, which typically includes an engine and a transmission. The driver of the vehicle usually controls the engine output by depressing the acceleration pedal or by an active assist system (e.g., cruise control). The transmission is typically controlled by the vehicle in an automatic transmission vehicle and by the driver of the vehicle in a manual transmission vehicle. Heretofore, the driver of the vehicle has controlled motive force of the vehicle by varying the output of the engine as determined by the angle of the acceleration pedal or throttle or by directly determining the output torque of the engine.

SUMMARY OF THE INVENTION

One aspect of the present invention is to provide a method of controlling tractive force of a vehicle comprising determining a tractive force request of a driver of the vehicle, determining an actual tractive force of the vehicle, and modifying the actual tractive force of the vehicle to be equal to the tractive force request.

Another aspect of the present invention is to provide a method of controlling tractive force of a vehicle comprising measuring an actual speed of the vehicle and sensing a position of an acceleration pedal. The method also includes looking up the tractive force request on a map corresponding to the actual speed and the position of the acceleration pedal. The method further includes modeling the actual tractive force of the vehicle and modifying the actual tractive force of the vehicle to be equal to the tractive force request.

Accordingly, the drive train of the vehicle will automatically output a tractive force at the wheels of the vehicle that corresponds to the requested tractive force of the driver of the vehicle. The method of controlling tractive force of a vehicle is easy to implement, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION OF THE PREFERRED EMBODIMENTS

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
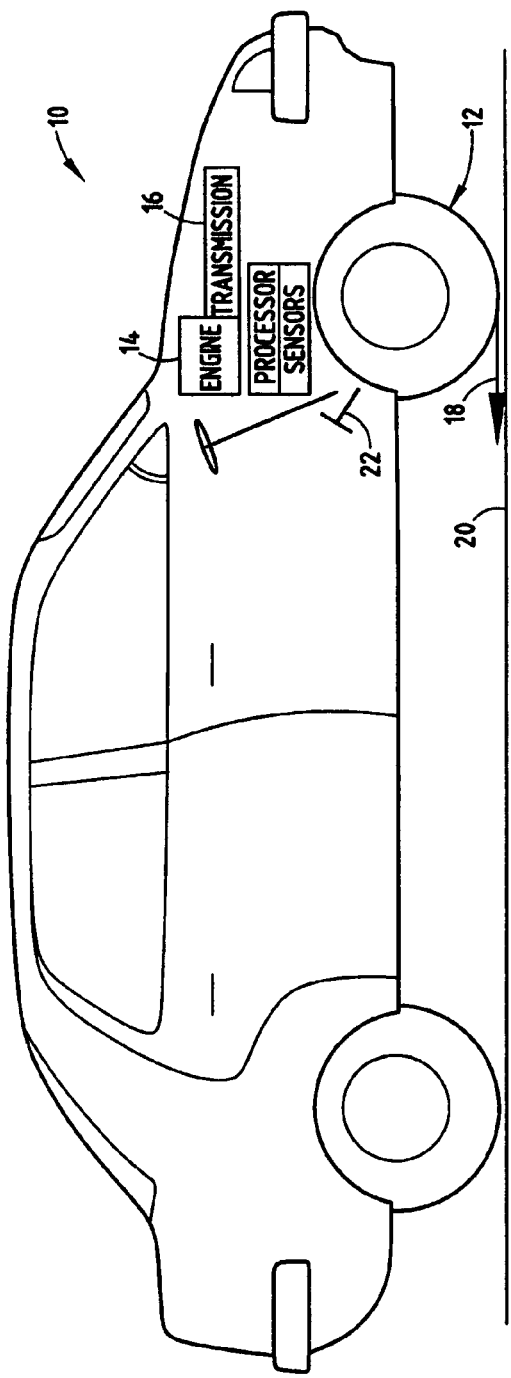
FIG. 1 is a schematic view of a vehicle embodying the present invention.

Referring to FIG. 1, reference number 10 generally designates a vehicle embodying the present invention. The vehicle 10 as disclosed herein is a front-wheel drive vehicle including front tires 12 that propel the vehicle 10. The front tires 12 are interconnected to a drive train comprising an engine 14 and a transmission 16 that power the front tires 12. A driver of the vehicle 10 controls a tractive force 18 applied to a riding surface 20 via the front tires 12 by means of an acceleration pedal 22 that controls the output of power from the engine 14 and the transmission 16. Accordingly, the tractive force 18 moves the vehicle 10 forward. Although a front wheel drive vehicle is illustrated herein, the vehicle of the present invention could include a rear-wheel drive or four wheel drive.

Figure 2:
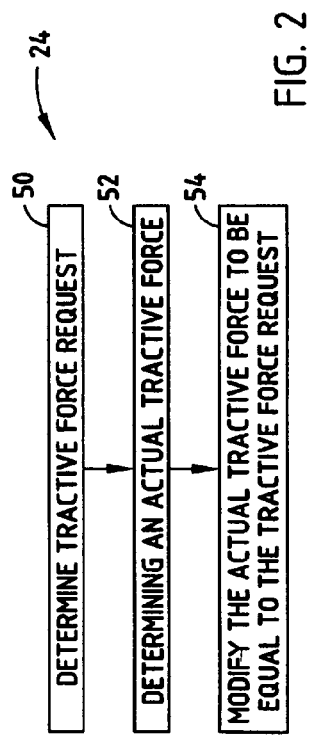
FIG. 2 is a diagram of a method of controlling traction of the vehicle using a tractive force map of the present invention.

The present invention provides a method 24 (FIG. 2) for controlling the tractive force 18 of the vehicle 10. The method of controlling the tractive force 18 of the vehicle 10 includes determining a tractive force request of a driver of the vehicle 10 at step 50. In the illustrated example, the tractive force request of the driver of the vehicle 10 is a request by the driver for a certain amount of force to be applied by the front tires 12 to the riding surface 20. Alternatively, if the vehicle has a rear wheel drive or four wheel drive, the tractive force request is a request for a certain amount of force to be applied by the rear wheels or all wheels, respectively.

In the illustrated invention, the tractive force request is a request for a percentage of maximum available tractive force (regardless of speed) for the vehicle 10 at the present speed of the vehicle 10. The tractive force request of the driver of the vehicle 10 is preferably determined by measuring an actual speed of the vehicle, sensing a position of the acceleration pedal 22, and looking up the tractive force request on a map corresponding to the actual speed and the position of the acceleration pedal.

Figure 3:
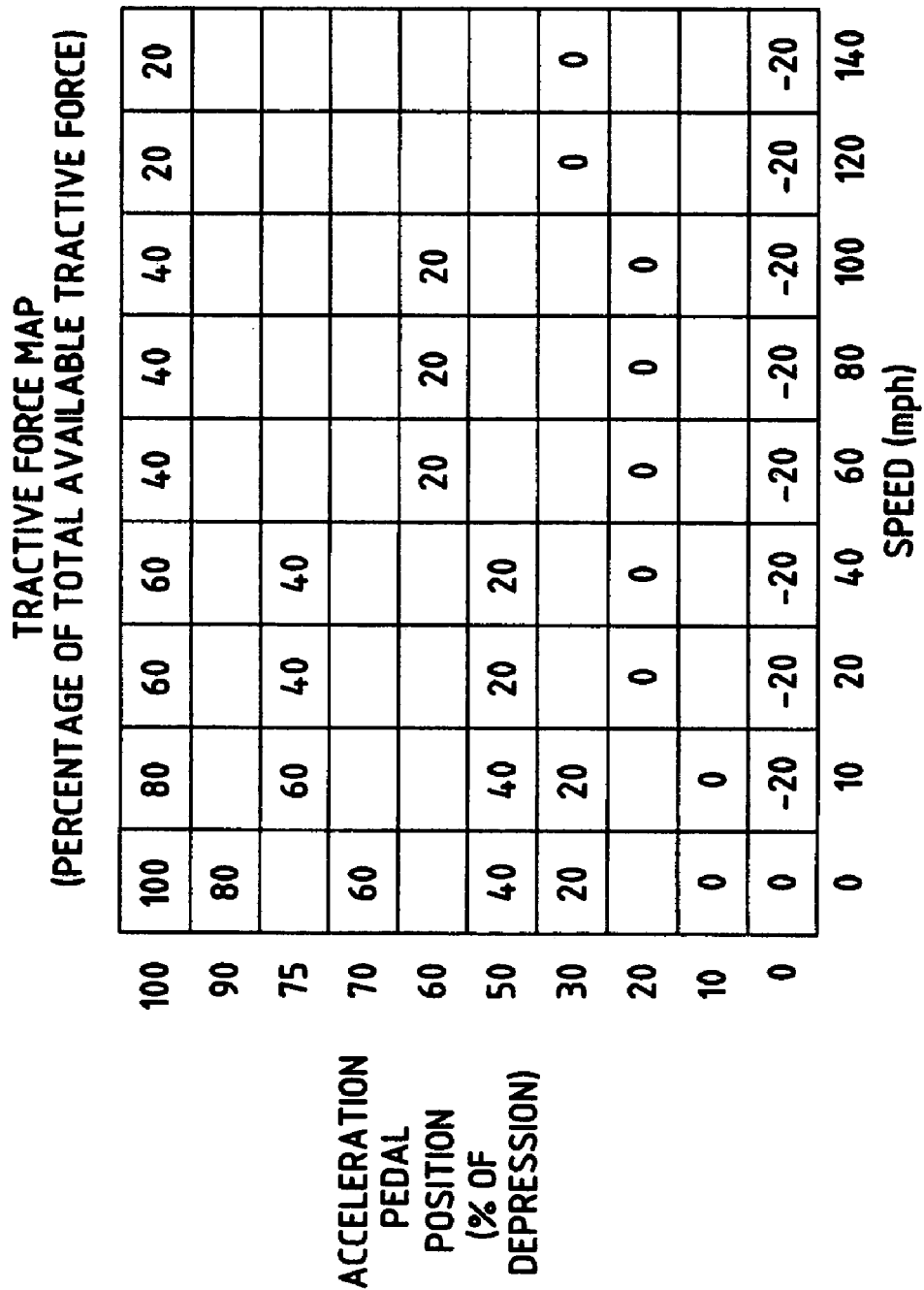
FIG. 3 is a graph of a sample tractive force map of the present invention.

FIG. 3 illustrates a tractive force map used in the method 24 for controlling the tractive force 18 of the vehicle 10. The tractive force map will change for each individual vehicle, depending on the engine torque curve and the transmission layout of the vehicle. FIG. 3 includes a vertical axis representing the position of the acceleration pedal 22 as a function of the percentage of the depression of the acceleration pedal 22. Therefore, if the acceleration pedal 22 is not being depressed, the percentage of depression of the acceleration pedal 22 will be 0%. Additionally, if the acceleration pedal 22 is fully depressed, the percentage of depression of the acceleration pedal 22 will be 100%. Likewise, if the acceleration pedal 22 is being depressed to a position 30% of the distance between not being depressed and being fully depressed, the percentage of depression of the acceleration pedal 22 will be 30%. The position of the acceleration pedal 22 is preferably measured directly by electrical means. The position of the acceleration pedal 22 can also be determined by measuring the position of the acceleration pedal 22, measuring the position of the valve controlling the volume of vaporized fuel charge delivered to the cylinders of the engine of the vehicle 10, measuring any electrical or mechanical element positioned in the communication line between the acceleration pedal and the valve controlling the fuel charge delivered to the engine, measuring the vacuum level in the engine manifold or any other means of measuring the position of the acceleration pedal 22.

FIG. 3 also includes a horizontal axis representing the present speed of the vehicle 10 in miles per hour. The present speed of the vehicle 10 is preferably measured using the speedometer of the vehicle 10. Alternatively, the present speed of the vehicle could be measured in any amount of distance (e.g. kilometers) for any amount of time. It is contemplated that other methods can be used to ascertain the present speed of the vehicle 10. Once the position of the acceleration pedal 22 and the present speed of the vehicle 10 are determined, the tractive force request of the driver of the vehicle 10 can be determined from the table of FIG. 3.

The tractive force request determined from the illustrative table of FIG. 3 is a requested percentage of the total available tractive force at the particular present speed of the vehicle. For example, when the vehicle 10 is travelling at 20 miles per hour and the acceleration pedal is depressed 75% of the distance between not depressed and fully depressed, the driver of the vehicle 10 is making a tractive force request for 40% of the available tractive force. As illustrated in FIG. 3, it is possible to have a negative tractive force request. When the acceleration pedal 22 is not being depressed and the vehicle has a positive velocity, not pressing the acceleration pedal 22 will slow (decelerate) the vehicle 10 because of mechanical losses in the vehicle, drag, etc. Therefore, when the acceleration pedal 22 is not being depressed and the vehicle has a positive velocity, the vehicle 10 will slow (decelerate). However, when the vehicle 10 has a zero velocity, the vehicle 10 will not and cannot slow down. Therefore, the tractive force request when the vehicle has a zero velocity and when the acceleration pedal is not being depressed is zero. Those skilled in the art will note that the vehicle may have a slight, negligible positive acceleration when the vehicle has a zero velocity, the acceleration pedal is not being depressed and the vehicle has an automatic transmission because of the drag in the torque converter.

In the present invention, as an option it can be valuable to modify the outcome of the map of FIG. 3 as a function of rate of change of the acceleration pedal 22. The rate of change of the acceleration pedal 22 could act as a prediction of the final value of the acceleration pedal 22 position. Therefore, a positive rate of change of the acceleration pedal 22 would add an extra tractive force percentage value to the value determined from FIG. 3. The extra value could be determined as a function of the acceleration pedal position and the rate of change of the acceleration pedal position for a given vehicle speed. Likewise, a negative rate of change of the acceleration pedal 22 would subtract an extra tractive force percentage value from the value determined from FIG. 3. The extra value used in the negative rate of change of the acceleration pedal 22 could also be determined as a function of the acceleration pedal position and the rate of change of the acceleration pedal position for a given vehicle speed. Consequently, the request for the percentage of available tractive force determined in step 52 of the method of controlling tractive force 24 would decrease as a function of a negative rate of change of the acceleration pedal position and would increase as a function of a positive rate of change of the acceleration pedal position. It is contemplated that adding or subtracting the extra value to the tractive force request would only be activated when the vehicle 10 is in a certain mode (e.g., a "sport" mode selected by the driver or by the driving situation of the vehicle).

After the tractive force request of the driver of the vehicle 10 is determined at step 50, an actual tractive force of the vehicle 10 is determined at step 52. Preferably, the actual tractive force of the vehicle 10 is determined by modeling the actual tractive force as a function of at least one of the following: vehicle speed, engine speed, rate of change of the speed of the engine, engine temperature, transmission temperature, ambient temperature, ambient pressure, accelerator pedal position, the air conditioning being on or off, and other auxiliary power consumers being on or off. The method of modeling the actual tractive force as used in the present invention is well known to those skilled in the art. Although the step 52 of determining the actual tractive force of the vehicle 10 is disclosed as taking place after the step 50 of determining the tractive force request of the driver of the vehicle, the step of determining the actual tractive force of the vehicle 10 could occur before or simultaneously with determining the tractive force request or could occur continuously.

Once the tractive force request of the driver of the vehicle 10 is determined at step 50 and the actual tractive force of the vehicle 10 is determined at step 52, the actual tractive force of the vehicle 10 is modified to be equal to the tractive force request at step 54. The actual tractive force of the vehicle 10 can be modified by increasing the engine torque or the engine (by changing the gear, transmission ratio and by other means known to those skilled in the art).

It will be readily appreciated by those skilled in the art that modifications may be made to the invention without departing from the concepts disclosed herein. Such modifications are to be considered as included in the following claims, unless these claims by their language expressly state otherwise.

We claim:

1. A method of controlling tractive force of a vehicle comprising:

determining a tractive force request of a driver of the vehicle;

determining an actual tractive force of the vehicle; and modifying the actual tractive force of the vehicle to be equal to the tractive force request;

wherein the step of determining the tractive force request comprises measuring an actual speed of the vehicle, sensing a position of an acceleration pedal, and looking up the tractive force request on a map corresponding to the actual speed and the position of the acceleration pedal.

2. A method of controlling tractive force of a vehicle comprising:

measuring an actual speed of the vehicle;

sensing a position of an acceleration pedal;

looking up the tractive force request on a map corresponding to the actual speed and the position of the acceleration pedal;

modeling the actual tractive force of the vehicle; and modifying the actual tractive force of the vehicle to be equal to the tractive force request;

wherein the tractive force request comprises a request for a percentage of maximum available tractive force of the vehicle; and wherein the percentage of available tractive force of the request for the percentage of available tractive force decreases as a function of a negative rate of change of the acceleration pedal position.

3. The method of controlling tractive force of claim 1, wherein:

the step of determining the actual tractive force comprises:

modeling the actual tractive force.

4. The method of controlling tractive force of claim 3, wherein:

the step of modeling the actual tractive force comprises:

modeling the actual tractive force as a function of at least one of the following:

vehicle speed, engine speed, engine temperature, transmission temperature and ambient temperature.

5. The method of controlling tractive force of claim 4, wherein:

the tractive force request comprises a request for a percentage of maximum available tractive force of the vehicle.

6. A method of controlling tractive force of a vehicle comprising:
   determining a tractive force request of a driver of the vehicle;
   determining an actual tractive force of the vehicle; and
   modifying the actual tractive force of the vehicle to be equal to the tractive force request;
   wherein the step of determining the actual tractive force comprises modeling the actual tractive force;
   wherein the step of modeling the actual tractive force comprises modeling the actual tractive force as a function of at least one of the following:
   vehicle speed, engine speed, engine temperature, transmission temperature and ambient temperature;
   wherein the tractive force request comprises a request for a percentage of maximum available tractive force of the vehicle; and
   wherein the percentage of available tractive force is negative when an acceleration pedal is not being depressed and the vehicle is moving, thereby decelerating the vehicle.

7. The method of controlling tractive force of claim 6, wherein:
   the percentage of available tractive force of the request for the percentage of available tractive force decreases for a given acceleration pedal position as the speed of the vehicle increases.

8. The method of controlling tractive force of claim 1, wherein:
   the tractive force request comprises a request for a percentage of maximum available tractive force of the vehicle.

9. A method of controlling a vehicle comprising:
   determining a tractive force request of a driver;
   determining an actual tractive force of the vehicle; and
   modifying the actual tractive force to be equal to the tractive force request;
   the tractive force request comprising a request for a percentage of maximum available tractive force, which is negative when an acceleration pedal is not being depressed, thereby decelerating the vehicle when the vehicle has a positive velocity.

10. A method of controlling a vehicle comprising:
    determining a tractive force request of a driver;
    determining an actual tractive force of the vehicle; and
    modifying the actual tractive force to be equal to the tractive force request;
    the tractive force request comprising a request for a percentage of maximum available tractive force of the vehicle, which decreases for a given acceleration pedal position as the speed of the vehicle increases.

11. A method of controlling a vehicle comprising:
    determining a tractive force request of a driver;
    determining an actual tractive force of the vehicle; and
    modifying the actual tractive force to be equal to the tractive force request;
    the tractive force request comprising a request for a percentage of maximum available tractive force of the vehicle, which increases as a function of a positive rate of change of an acceleration pedal position.

12. A method of controlling a vehicle comprising:
    determining a tractive force request of a driver;
    determining an actual tractive force of the vehicle; and
    modifying the actual tractive force to be equal to the tractive force request;
    the tractive force request comprising a request for a percentage of maximum available tractive force of the vehicle, which decreases as a function of a negative rate of change of an acceleration pedal position.

13. A method of controlling tractive force of a vehicle comprising:
    measuring an actual speed of the vehicle;
    sensing a position of an acceleration pedal;
    looking up the tractive force request on a map corresponding to the actual speed and the position of the acceleration pedal;
    modeling the actual tractive force of the vehicle;
    modifying the actual tractive force of the vehicle to be equal to the tractive force request.

14. The method of controlling tractive force of claim 13, wherein:
    the step of modeling the actual tractive force comprises:
    modeling the actual tractive force as a function of at least one of the following:
    vehicle speed, engine speed, engine temperature, transmission temperature and ambient temperature.

15. The method of controlling tractive force of claim 13, wherein:
    the tractive force request comprises a request for a percentage of maximum available tractive force of the vehicle.

16. A method of controlling tractive force of a vehicle comprising:
    measuring an actual speed of the vehicle;
    sensing a position of an acceleration pedal;
    looking up the tractive force request on a map corresponding to the actual speed and the position of the acceleration pedal;
    modeling the actual tractive force of the vehicle; and
    modifying the actual tractive force of the vehicle to be equal to the tractive force request;
    wherein the tractive force request comprises a request for a percentage of maximum available tractive force of the vehicle; and
    wherein the percentage of available tractive force is negative when the acceleration pedal is not being depressed and the vehicle is moving, thereby decelerating the vehicle when the vehicle has a positive velocity.

17. A method of controlling tractive force of a vehicle comprising:
    measuring an actual speed of the vehicle;
    sensing a position of an acceleration pedal;
    looking up the tractive force request on a map corresponding to the actual speed and the position of the acceleration pedal;
    modeling the actual tractive force of the vehicle; and
    modifying the actual tractive force of the vehicle to be equal to the tractive force request;
    wherein the tractive force request comprises a request for a percentage of maximum available tractive force of the vehicle; and
    wherein the percentage of available tractive force of the request for the percentage of available tractive force decreases for a given acceleration pedal position as the speed of the vehicle increases.

18. A method of controlling tractive force of a vehicle comprising:
    measuring an actual speed of the vehicle;
    sensing a position of an acceleration pedal;
    looking up the tractive force request on a map corresponding to the actual speed and the position of the acceleration pedal;
    modeling the actual tractive force of the vehicle; and modifying the actual tractive force of the vehicle to be equal to the tractive force request;

wherein the tractive force request comprises a request for a percentage of maximum available tractive force of the vehicle; and wherein the percentage of available tractive force of the request for the percentage of available tractive force increases as a function of a positive rate of change of the acceleration pedal position.

19. The method of controlling tractive force of claim 2, wherein:

the percentage of available tractive force of the request for the percentage of available tractive force increases as a function of a positive rate of change of the acceleration pedal position.

* * * * *